No. 691,335. Patented Jan. 14, 1902.
K. W. CARLGREN.
ANIMAL TRAP.
(Application filed June 13, 1901.)
(No Model.)
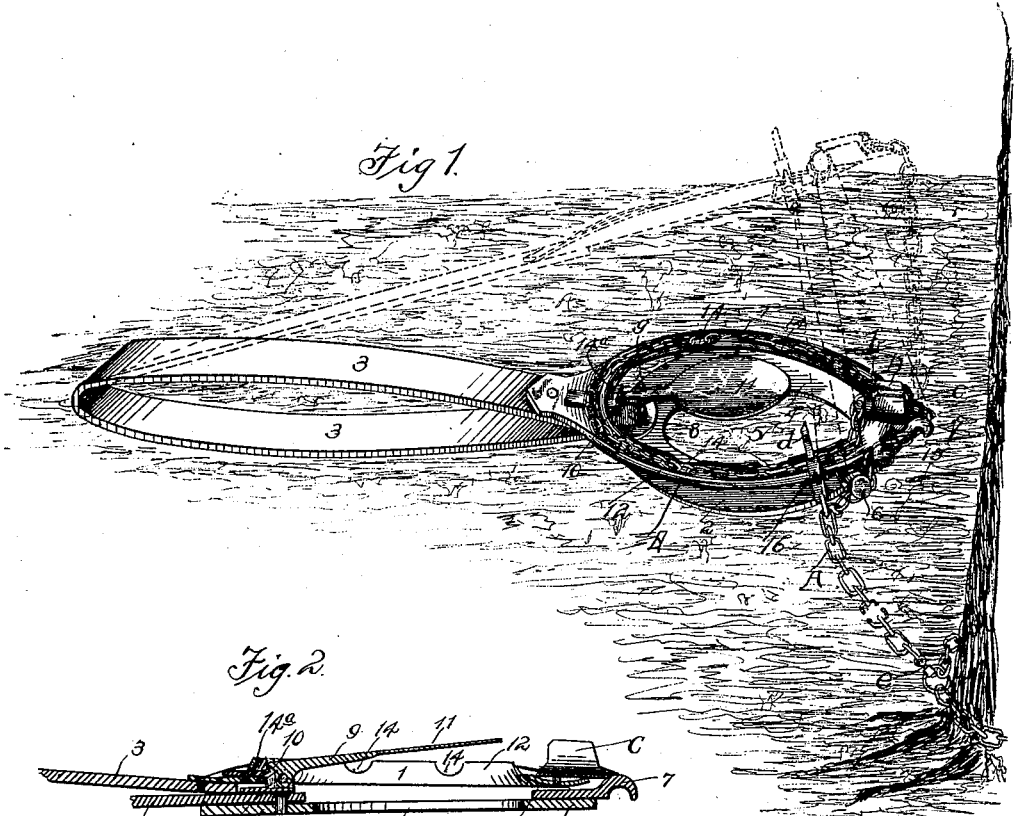
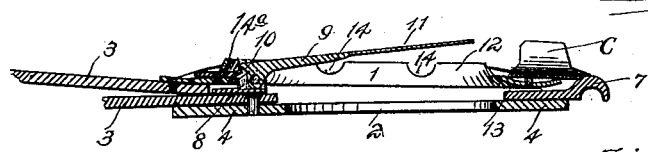
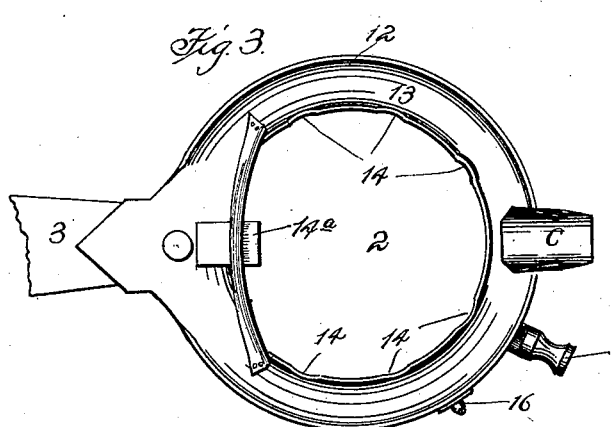
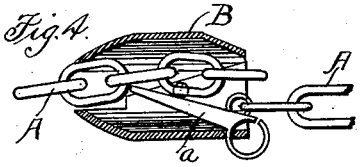
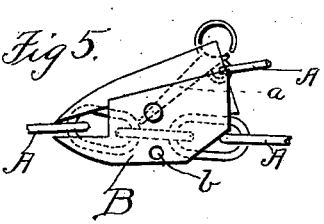
Witnesses
Inventor
Knut W. Carlgren
by Schmann & Dalton
Attorneys

UNITED STATES PATENT OFFICE.

KNUT W. CARLGREN, OF EAST MILLCREEK, UTAH.

ANIMAL-TRAP.

SPECIFICATION forming part of Letters Patent No. 691,335, dated January 14, 1902.

Application filed June 13, 1901. Serial No. 64,461. (No model.)

*To all whom it may concern:*

Be it known that I, KNUT W. CARLGREN, a citizen of the United States, residing at East Millcreek, in the county of Salt Lake and State of Utah, have invented certain new and useful Improvements in Animal-Traps; and I do hereby declare the following to be a full, clear, and exact description of the invention, such as will enable others skilled in the art to which it appertains to make and use the same.

My invention relates to animal-traps, and is more particularly adapted for trapping large animals; and its object is to construct a trap of this character which is conveniently set, which is capable of being easily and rapidly released, which avoids the liability of maiming the animal after being caught, and which, moreover, renders it possible for a human being who might accidentally spring the trap to easily release him or herself.

My invention consists of two normally separated spring jaw members adapted to be held interlocked when brought together, one member carrying a locking-trigger and the other a flexible loop, and means upon both members for drawing up the loop when the trigger is released and the jaws are sprung apart.

Other objects and advantages will appear in the following description, and the novel features will be pointed out in the appended claims.

For a full understanding of the merits and construction of my invention reference is to be had to the accompanying drawings, in which—

Figure 1 is a perspective view of the trap shown in a set position in full lines and released in dotted lines and embodying all the features of my invention. Fig. 2 is a longitudinal section of the trap in a set position, the spring being broken away. Fig. 3 is a top plan view of the upper jaw. Fig. 4 is a longitudinal section of the chain lock or clamp. Fig. 5 is a perspective of the chain-lock.

Like characters of reference indicate corresponding parts throughout the several views.

Referring to the drawings, 1 and 2 represent the upper and lower jaw members, connected by a U-shaped flat spring 3, the free ends of which are riveted or otherwise rigidly secured to each of the jaw members and by means of which they are normally held apart, as shown in dotted lines in Fig. 1. The lower jaw comprises in its construction a concentric plate 4, having a central opening 5 and provided with the projecting hooks 6 and 7, extending beyond the outer periphery of the plate, and which hooks are adapted to have a chain, rope, or other flexible connection A passed around them, the purpose for which will hereinafter be described. Secured upon the lower jaw member is a plate 8, in which is mounted a trigger 9, provided at its inner end with a notch 10 and at its outer end with a trigger-foot 11.

The upper jaw 1 is composed of a concentric plate 12, provided with a dished or grooved concaved face 13 and the semicircular notches 14, formed in the inner edge of the plate. The plate 12 is provided with a lug $14^a$, arranged in vertical alinement with the notch 10 in the trigger 9 and adapted to engage the notch 10 when the jaws are brought together and hold the trap in a set position; but when the trigger-foot 11 is thrown downwardly and the notch disengaged from the lug the upper jaw, by reason of the action of the spring 3, tending to spread the jaws apart, will force the upper jaw upwardly and the trap will assume its normal position, as shown in dotted lines in Fig. 1. Secured upon the lower face of the plate 12 and projecting outwardly and upwardly therefrom is a chain-hook 15 and a stud 16, the latter adapted to receive the bait-prong *d*, attached to the chain and which bait-prong may have any suitable means for attaching it to the stud.

The chain A has attached to it at one end a suitable chain-lock or gripping device B, composed of two pivoted jaws having a locking-pawl *a*, secured to one jaw, and the end of the chain being connected to the locking-pawl (shown in Fig. 4) tends to draw the latter upwardly and throw the free end in engagement with the chain which passes through the jaws. When the pull upon the end of the chain is released, the locking-pawl will drop and be disengaged from the chain and by pressing the jaws together back of the fulcrum-point the grip on the chain will be released and the chain allowed to slide freely through the lock. If for any reason the locking-pawl *a* should be obstructed in its movement, one jaw is provided with an aperture *b*, through which any small instrument may be inserted to engage the locking-pawl and press it downwardly, and thereby disengage it from the chain. The chain has attached thereto the bait-prong *d*, which is adapted to be hooked upon the stud 16 when the trap is set, as shown in full lines in Fig. 1. When the trap is set, a suitable portion of the chain is pulled through the chain-lock B to form a loop which is adapted to lie in the semicircular groove or dished portion of the upper plate, and when the jaws have been brought together, so that the notch in the trigger 9 engages the lug 14$^a$, the chain-lock is placed within a suitable lock-holder *c*, mounted upon the outer edge of the plate, and the remaining portion of the chain is then passed downwardly under the hooks 7, upwardly over the hook 15, again downwardly and around the hook 6, and the bait-prong attached to the stud 16. The free end of the chain may be secured to a stump, tree, post, or other permanent securing means. When the trigger-foot 11 is pressed downwardly by the foot of an animal, the notch 10 in the trigger will be released from the lug 14$^a$ and the spring will immediately cause the upper jaw to be thrown upwardly, as shown in dotted lines in Fig. 1. This will cause the loop or slack in the chain to immediately be taken up as the other end of the chain rides over the hooks 6, 7, and 15 as the jaws expand and the semicircular notches 14, formed in the inner edge of the upper plate, will allow the chain to easily slide out of the groove and prevent the chain from being caught or its motion interfered with as the jaw moves upwardly. The loop in the chain is now tightly grasped around the limb of the animal and the chain-gripping device prevents the loop from being released.

When the animal has released his foot from the trigger-foot, the chain will be disengaged from the hooks and the stud 16 and the harder the animal jerks and pulls on the chain the tighter the loop will be fastened around the animal's limb.

It will be apparent from this construction of trap that the animal cannot twist or break his leg in the trap, as they so often do in the common steel animal-traps, because he gets entirely free from the main jaw and is simply secured to one end of the chain, while the other end is secured to a tree, stump, post, or any suitable convenient fastening device. The swivel *e* in the chain will allow the chain to have free movement and prevent the same from breaking. If a human being should accidentally step upon the trigger-foot and release the upper jaw, he or she could easily be released by inserting some small instrument, such as a stick or nail, through the opening *b* in the chain-lock and press the pawl *a* from engagement with the chain.

If it is desired, the lower jaw 1 and the lower portion of the spring 3 may be secured to the ground by spikes or other suitable fastening means.

Having thus described my invention, what I claim as new, and desire to secure by Letters Patent, is—

1. An animal-trap comprising two normally separated spring jaw members adapted to be held interlocked when brought together, one member carrying a locking device and the other a catching means, and means upon the catching means to lock it around the limb of the animal.

2. An animal-trap comprising two jaw members connected by a spring and held normally separated by said spring, a locking-trigger mounted on the lower member and provided with a notch, a lug upon the upper member adapted to engage the notch in the locking-trigger and hold the jaws together, a chain carried by the upper member and provided with a gripping device, the free end of the chain adapted to be engaged alternately upon the upper and lower members, and a lock-holder secured to the upper member in which the gripping device rests when the trap is set, substantially as described.

3. In an animal-trap, the combination of two normally separated spring jaw members adapted to be locked when brought together, of a chain, the free end of which is adapted to be secured to a permanent fastening means and the other end formed into a loop, a groove formed in the upper face of the upper member in which the loop is adapted to rest, of a gripping device carried by one end of the chain, a lock-holder upon the upper jaw member in which the gripping device is adapted to rest, and means upon the two members for drawing the chain through the gripping device to grasp the limb of the animal.

4. In an animal-trap, the combination of two jaw members connected by a U-shaped flat spring, of a locking-trigger mounted upon the lower member and adapted to engage the upper member when the jaws are brought together, a dished or grooved concaved face formed in the upper member, of a chain formed into a loop and which loop is adapted to rest in the concaved face, hooks projecting from both the upper and lower members over which the free end of the chain passes, and a gripping device upon the chain, substantially as described.

In testimony whereof I affix my signature in presence of two witnesses.

KNUT W. CARLGREN.

Witnesses:
CHARLES GORNEMAN,
MARETTA BURNHAM.